United States Patent
Fang et al.

(10) Patent No.: US 9,234,082 B2
(45) Date of Patent: Jan. 12, 2016

(54) POLYMER MATERIAL HAVING HIGH CAPACITY FOR HYDROGEN STORAGE AND PREPARATION METHOD THEREOF

(71) Applicant: Wuhan Kaidi Engineering Technology Research Institute Co., Ltd., Wuhan (CN)

(72) Inventors: Zhangjian Fang, Wuhan (CN); Yilong Chen, Wuhan (CN); Yanfeng Zhang, Wuhan (CN); Xingcai Zheng, Wuhan (CN); Yongjie Xue, Wuhan (CN); Leiming Tao, Wuhan (CN)

(73) Assignee: Wuhan Kaidi Engineering Technology Research Institute Co., Ltd., Wuhan (CN)

( * ) Notice: Subject to any disclaimer, the term of this patent is extended or adjusted under 35 U.S.C. 154(b) by 0 days.

(21) Appl. No.: 14/660,962

(22) Filed: Mar. 18, 2015

(65) Prior Publication Data

US 2015/0191573 A1    Jul. 9, 2015

Related U.S. Application Data

(63) Continuation-in-part of application No. PCT/CN2013/083371, filed on Sep. 12, 2013.

(30) Foreign Application Priority Data

Sep. 18, 2012  (CN) .......................... 2012 1 0347088

(51) Int. Cl.
  *C08F 8/04* (2006.01)
  *C08J 5/18* (2006.01)
  *C08F 8/32* (2006.01)
  *C01B 3/00* (2006.01)
  *C08G 73/02* (2006.01)
  *C08G 77/26* (2006.01)

(52) U.S. Cl.
  CPC ................. *C08J 5/18* (2013.01); *C01B 3/0015* (2013.01); *C08F 8/04* (2013.01); *C08F 8/32* (2013.01); *C08G 73/0226* (2013.01); *C08G 77/26* (2013.01); *C08J 2327/06* (2013.01); *C08J 2333/02* (2013.01); *Y02E 60/328* (2013.01)

(58) Field of Classification Search
  None
  See application file for complete search history.

(56) References Cited

U.S. PATENT DOCUMENTS

| | | | | | |
|---|---|---|---|---|---|
| 4,107,099 | A | * | 8/1978 | Hedge | 521/30 |
| 4,281,086 | A | * | 7/1981 | Gaul et al. | 525/331.3 |
| 5,684,102 | A | * | 11/1997 | Pocius et al. | 526/198 |
| 8,029,602 | B1 | * | 10/2011 | Groshens | 95/90 |
| 2008/0226728 | A1 | * | 9/2008 | Domb et al. | 424/489 |

* cited by examiner

*Primary Examiner* — Robert C Boyle
(74) *Attorney, Agent, or Firm* — Matthias Scholl P.C.; Matthias Scholl

(57) ABSTRACT

A high capacity polymer hydrogen storage material, including a linear high molecular polymer as a main chain. At least one side chain or a terminal group of the linear high molecular polymer is first aminated using a polyamine compound and then reacts with a borohydride to yield an ammonia borane derivative grafted to the side chain or the terminal group of the linear high molecular polymer.

9 Claims, 5 Drawing Sheets

POLYMER MATERIAL HAVING HIGH CAPACITY FOR HYDROGEN STORAGE AND PREPARATION METHOD THEREOF

CROSS-REFERENCE TO RELATED APPLICATIONS

This application is a continuation-in-part of International Patent Application No. PCT/CN2013/083371 with an international filing date of Sep. 12, 2013, designating the United States, now pending, and further claims priority benefits to Chinese Patent Application No. 201210347088.5 filed Sep. 18, 2012. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

1. Field of the Invention

The invention relates to a high capacity polymer hydrogen storage material and preparation method thereof.

2. Description of the Related Art

Based on the hydrogen adsorption forces, hydrogen storage materials are divided into two categories: physical adsorption material and chemical absorption material. Chemical adsorption material includes metal hydride material, hydride material, ammonia borane derivative, and so on Ammonia borane ($NH_3BH_3$, AB) has superhigh hydrogen density (19.6 wt. %), moderate heat stability and good chemical stability. The preparation method of AB includes borane method and sodium borohydride method. However, both the methods have such problems as low hydrogen release speed and limited hydrogen storage capacity, and produce harmful impurity gases. In addition, the resulting hydrogen storage material suffers uneven heating in use.

SUMMARY OF THE INVENTION

In view of the above-described problems, it is one objective of the invention to provide a high capacity polymer hydrogen storage material features high hydrogen storage capacity and low hydrogen release temperature. The material is solid and flexible, is easy to form a thin film, thus the heating is uniform thereby benefitting the hydrogen release.

To achieve the above objective, in accordance with one embodiment of the invention, there is provided a high capacity polymer hydrogen storage material, comprising a linear high molecular polymer as a main chain. A side chain or a terminal group of the linear high molecular polymer is first aminated using a polyamine compound and then reacts with a borohydride to yield an ammonia borane derivative grafted to the side chain or the terminal group of the linear high molecular polymer.

In a class of this embodiment, the linear high molecular polymer comprises polyvinyl chloride, polyvinyl chloride-polyethylene copolymer, polyethyleneimine, acrylate copolymer, polyacrylic acid, polystyrene, styrene-acrylate copolymer, polysiloxane; and the polyamine compound comprises 1-methyl-guanidine, guanidine, ethylenediamine, diethylenetriamine.

In a class of this embodiment, the linear high molecular polymer as the main chain of the hydrogen storage material has a molecular of between 5000 and 50000, and the ammonia borane derivative grafted to the side chain or the terminal group of the linear high molecular polymer accounts for between 25 and 75 wt. % of a total weight of the linear high molecular polymer.

In a class of this embodiment, the hydrogen storage material is processed into a film.

In accordance with another embodiment of the invention, there is provided a method for preparing a high capacity high molecular polymer hydrogen storage material, the method comprising: 1) providing a linear high molecular polymer, aminating using a polyamine compound a side chain or a terminal group of the linear high molecular polymer to yield a polymer comprising functionalized amine; and 2) mixing and stirring the polymer comprising functionalized amine and a borohydride according to a stoichiometry ratio in an organic suspension at a temperature of between 5 and 50° C. for between 1 and 12 hours, filtering and collecting a lower organic phase, removing an organic solvent therefrom by vacuum distillation, and washing a resulting product, whereby obtaining a high capacity high molecular polymer hydrogen storage material.

In a class of this embodiment, the linear high molecular polymer comprises polyvinyl chloride, polyvinyl chloride-polyethylene copolymer, polyethyleneimine, acrylate copolymer, polyacrylic acid, polystyrene, styrene-acrylate copolymer, polysiloxane; and the polyamine compound comprises 1-methyl-guanidine, guanidine, ethylenediamine, diethylenetriamine.

In a class of this embodiment, the organic suspension comprises tetrahydrofuran, acetonitrile, dimethylsulfoxide, and the borohydride is selected from the group consisting of sodium borohydride, lithium borohydride, and potassium borohydride.

In a class of this embodiment, prior to the amination, the side chain or the terminal group of the linear high molecular polymer is chemically modified.

In a class of this embodiment, the method further comprise post-processing the obtained high capacity high molecular polymer hydrogen storage material to form a film.

The high capacity polymer hydrogen storage material is prepared by first chemically modifying the linear high molecular polymer through grafting a polyamine compound to a side chain or a terminal group of the linear high molecular polymer, and then introducing a chemical reaction to yield ammonia borane derivatives on the side chain or the terminal group of the linear high molecular polymer. The hydrogen storage capacity of the material is adjustable by the selection of the linear polymer. The pyrolytic hydrogen release temperature is low (60° C.-250° C., preferably, 90-160° C.), and no harmful impurity gas such as boron-triazine, diborane, ammonia produced. In the process of hydrogen release, the introduction of Wilkinson's catalyst can significantly improve the hydrogen release capacity and hydrogen release performance. In addition, the material is a solid flexible material, has good film-forming property, so it is easy to form a thin film, thereby preventing the uncontrollability of the hydrogen release resulting from uneven heating. For example, when used in the automobile field, the material is coated on the radiating fins of the automobiles, thus, the heating is uniform, and the hydrogen release performance is good.

Advantages according to embodiments of the invention are summarized as follows:

1) The hydrogen storage capacity of the high capacity polymer hydrogen storage material is adjustable, the hydrogen release temperature is low, and no harmful impurity gas produced;

2) The high capacity polymer hydrogen storage material is a solid flexible material with good film-forming property, so it is easy to form a thin film, thereby preventing the uncontrollability of the hydrogen release resulting from uneven heating; and 3) The preparation method of the high capacity polymer hydrogen storage material is simple, with moderate cost, thereby being suitable for mass production.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a high capacity polymer hydrogen storage material and a preparation method are described below. It should be noted that the following examples are intended to describe and not to limit the invention.

Example 1

Preparation of High Capacity Polymer Hydrogen Storage Material c

Figure 1:
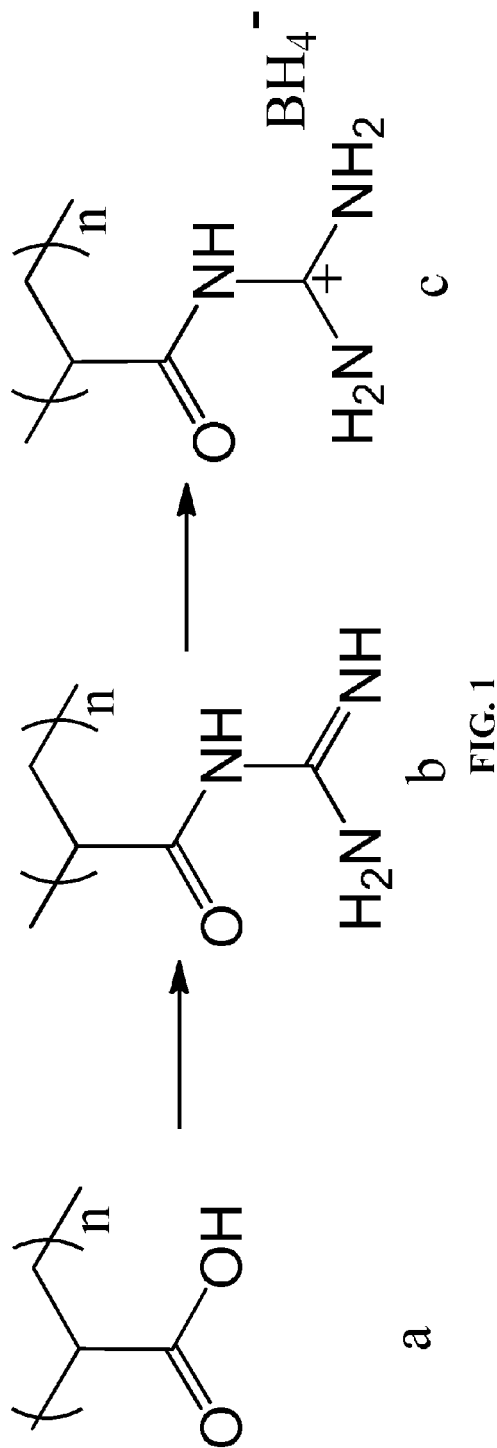
FIG. 1 is a synthetic route a polymer hydrogen storage material c according to Example 1 of the invention.

As shown in FIG. 1, a polymer a (polyacrylic acid, molecular weight of 5000) was added to cold methylene chloride, followed by the addition of excess thionyl chloride. The mixture was stirred for an hour at 0° C., and then the solvent was removed through spin dry. The resulting product was dissolved with dried dichloromethane, and then guanidine and triethylamine were added. The mixture was allowed to react at 0° C. for 2 hours, and then was spin dried. The obtained product was washed thrice with deionized water and then dried to yield an aminated polymer b.

The aminated polymer b and sodium borohydride were mixed according to a stoichiometry ratio in a tetrahydrofuran suspension at 25° C. for 12 hours. The mixture was filtered and the lower organic phase collected, and the organic solvent therefrom was removed by vacuum distillation. The resulting product was washed twice with ether, whereby obtaining a high capacity high molecular polymer hydrogen storage material c comprising 57 wt. % of ammonia borane derivative.

The performance test of hydrogen release of the hydrogen storage material c was carried out. The result showed that, the hydrogen release temperature of the material c is about 105° C., and about 6.2 wt. % of pure hydrogen is released at the temperature.

Example 2

Preparation of High Capacity Polymer Hydrogen Storage Material d

Figure 2:
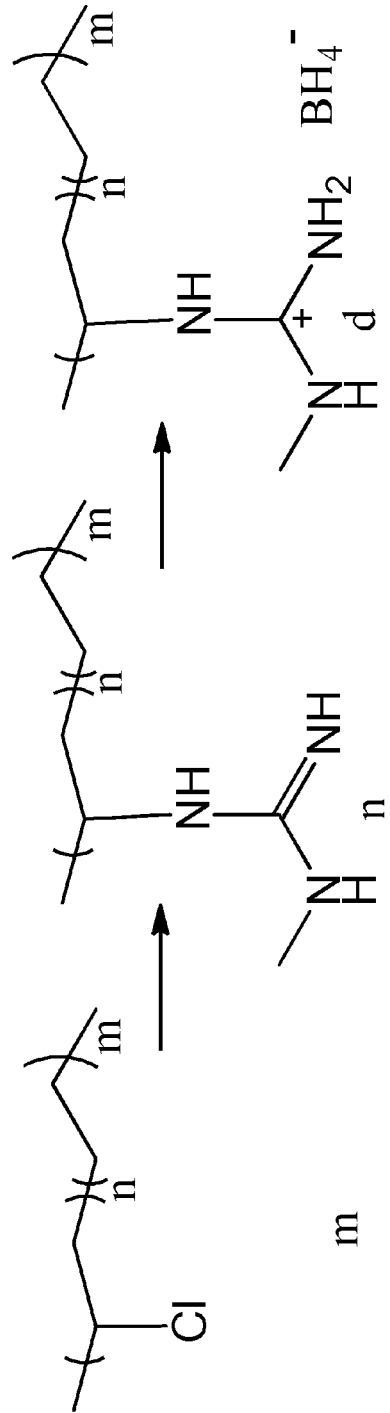
FIG. 2 is a synthetic route a polymer hydrogen storage material d according to Example 2 of the invention.

As shown in FIG. 2, a polyvinyl chloride-polyethylene copolymer m (molecular weight of 50000, and the degree of polymerization of the polyvinyl chloride monomer is 750) was dissolved in dried dichloromethane, and then 1-methylguanidine and triethylamine were added. The mixture was allowed to react at 20° C. for 12 hours, and then was spin dried. The obtained product was washed thrice with deionized water and then dried to yield an aminated polymer n.

The aminated polymer n and sodium borohydride were mixed according to a stoichiometry ratio in an tetrahydrofuran suspension at 20° C. for 8 hours. The mixture was filtered and the lower organic phase collected, and the organic solvent therefrom was removed by vacuum distillation. The resulting product was washed twice with ether, whereby obtaining a high capacity high molecular polymer hydrogen storage material d comprising 75 wt. % of ammonia borane derivative.

Figure 3:
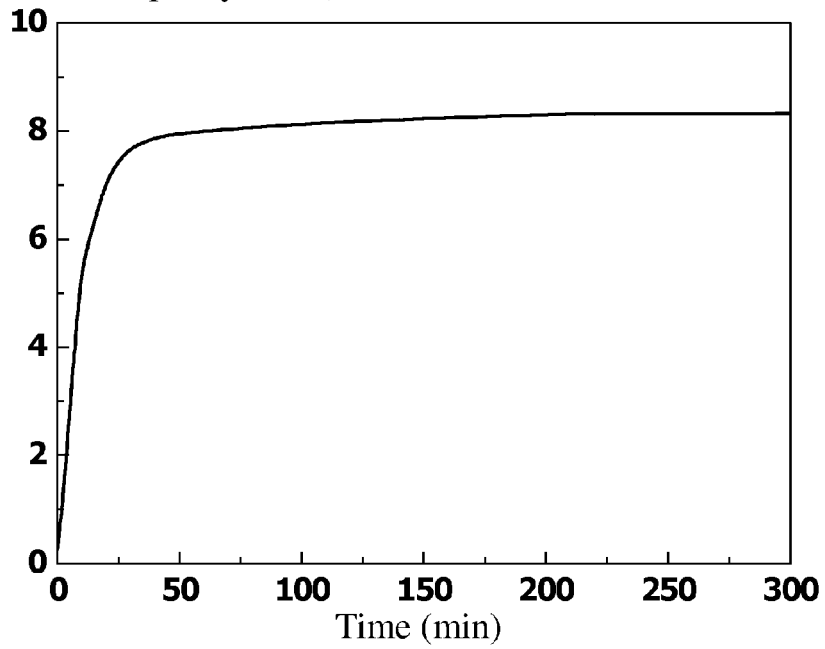
FIG. 3 is a kinetic curve of hydrogen release of a polymer hydrogen storage material d according to one embodiment of the invention.
Figure 4:
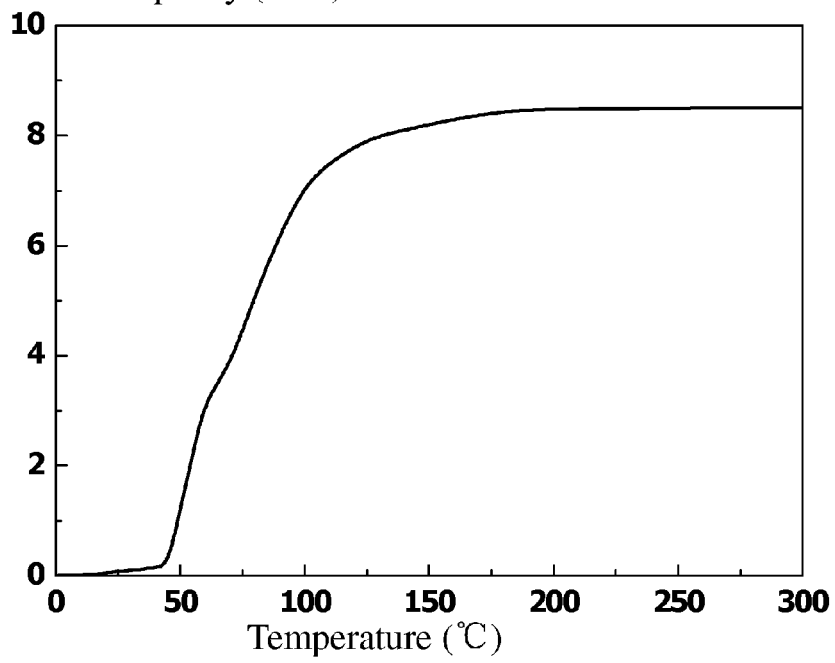
FIG. 4 is a diagram of temperature programmed desorption of a polymer hydrogen storage material d according to one embodiment of the invention.

The performance test of hydrogen release of the hydrogen storage material d was carried out. FIGS. 3-4 showed a hydrogen release kinetic curve and temperature programmed desorption of the material d, respectively. The result showed that, the hydrogen release temperature of the material c is low (about 50° C.). With the increase of the temperature, the hydrogen release reaction accelerates abruptly in almost one step. The peak temperature of the hydrogen release is 100° C., and about 8 wt. % of hydrogen was released. In the whole hydrogen release process, no harmful gas was produced.

Figure 5:
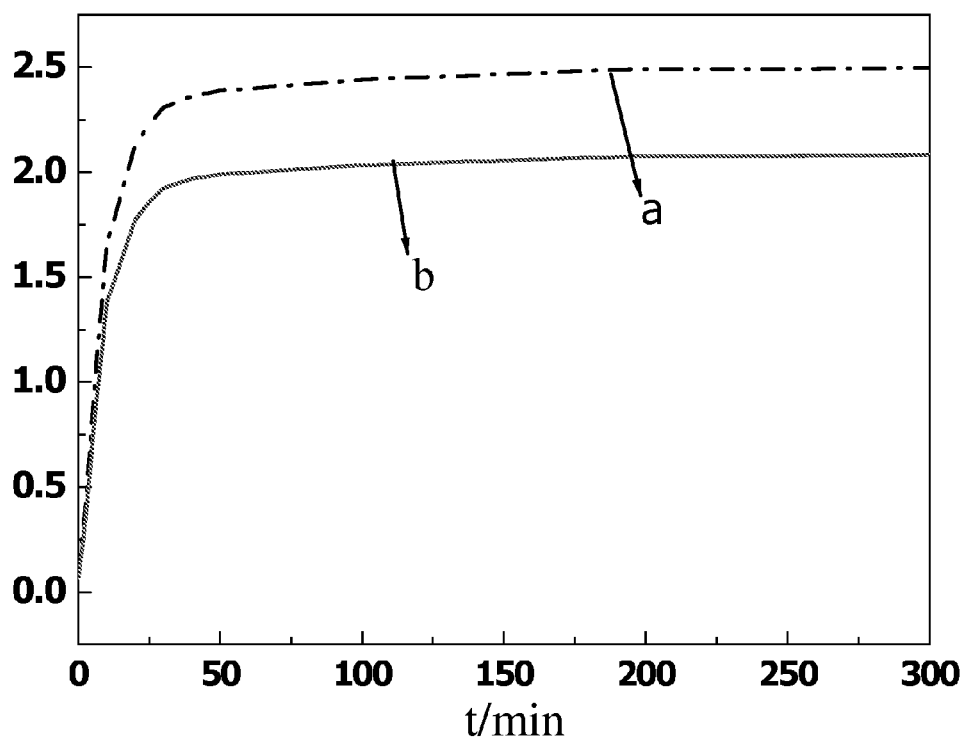
FIG. 5 shows kinetics curves describing the influence of Wilkinson's catalyst on the hydrogen release of a polymer hydrogen storage material d, where curve a shows the result in the presence of the Wilkinson's catalyst, while curve a shows the result in the absence of the Wilkinson's catalyst.

In contrast, the Wilkinson's catalyst was added in the hydrogen release process, and the hydrogen release performance of the hydrogen storage material d was carried out as shown in FIG. 5, which showed that, after introducing the Wilkinson's catalyst, the hydrogen release performance of the hydrogen storage material was improved significantly.

Example 3

Preparation of High Capacity Polymer Hydrogen Storage Material h

Figure 6:
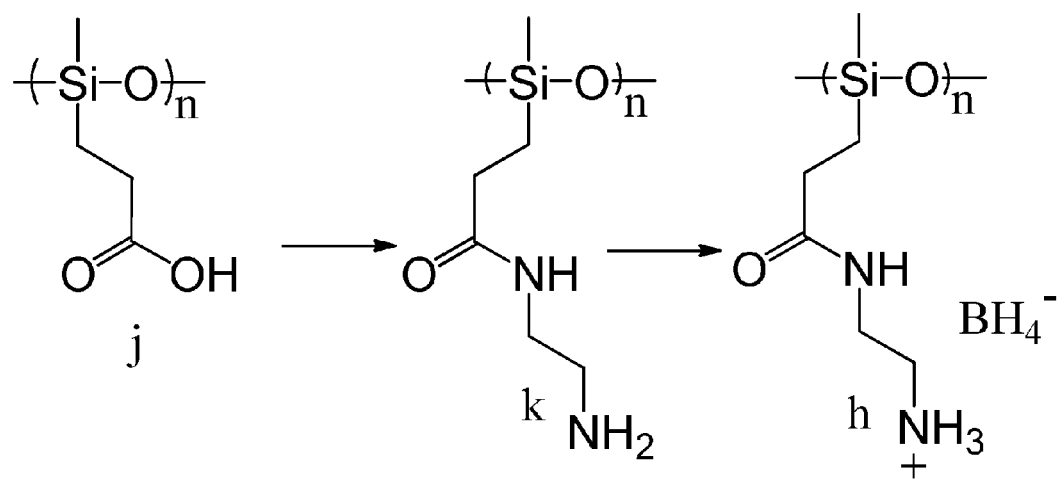
FIG. 6 is a synthetic route a polymer hydrogen storage material h according to Example 3 of the invention.

As shown in FIG. 6, a polymer j (molecular weight of 16000) was added to cold methylene chloride, followed by the addition of excess thionyl chloride. The mixture was stirred for 2 hours at 0° C., and then the solvent was removed through spin dry. The resulting product was dissolved with dried dichloromethane, and then ethylenediamine and potassium carbonate were added. The mixture was allowed to react at 5° C. for 2 hours, and then was spin dried. The obtained product was washed thrice with deionized water and then dried to yield an aminated polymer k.

The aminated polymer k and sodium borohydride were mixed according to a stoichiometry ratio in a dimethyl sulfoxide suspension at 50° C. for 6 hours. The mixture was filtered and the lower organic phase collected, and the organic solvent therefrom was removed by vacuum distillation. The resulting product was washed twice with ether, whereby obtaining a high capacity high molecular polymer hydrogen storage material comprising 39.6 wt. % of ammonia borane derivative.

The performance test of hydrogen release of the hydrogen storage material h was carried out. The result showed that, the peak temperature of hydrogen release of the material h is about 110° C., about 3.8 wt. % of pure hydrogen is released at the temperature, and no harmful impurity gas produced in the process.

Example 4

Figure 7:
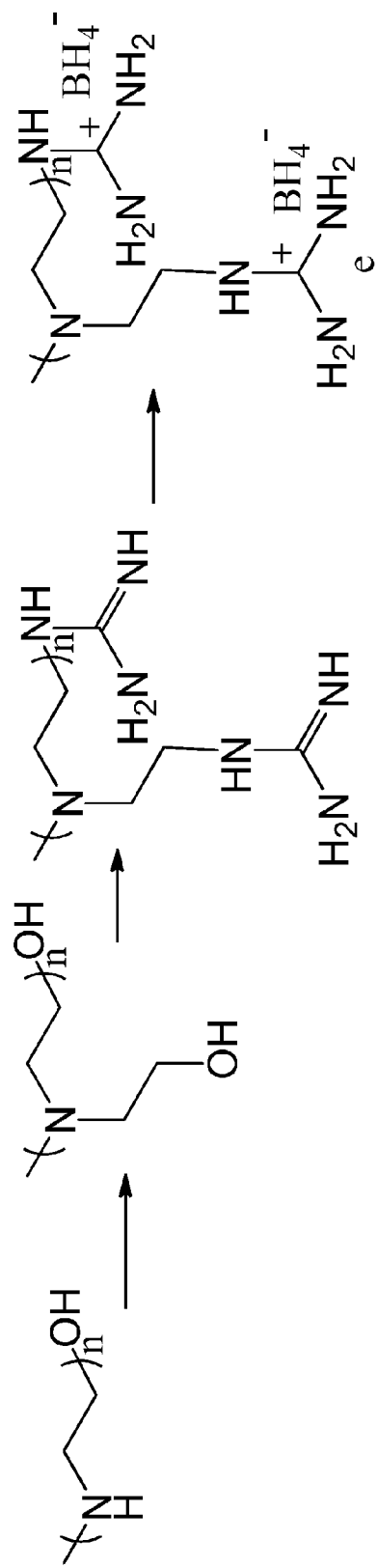
FIG. 7 is a synthetic route a polymer hydrogen storage material e according to Example 4 of the invention.

As shown in FIG. 7, polymine having the molecular weight of 5000 was added to acetonitrile, followed by the addition of bromoethanol and potassium carbonate according to the stoichiometry ratio. The mixture was stirred at 80° C. for 24 hours. The precipitate was filtered, washed with water, dried, and dissolved in anhydrous dichloromethane. Thereafter, 1.5 equivalents of methanesulfonyl chloride and triethylamine was added to the solution. 2 hours later, the solvent was removed by spin dry, and the solute was extracted by dichloromethane, and dried, followed by the addition of guanidine and triethylamine. The mixture was allowed to react at 25° C. overnight, and then was filtered and washed to yield an aminated polymer.

The aminated polymer and potassium borohydride were mixed according to a stoichiometry ratio in a dimethyl sulfoxide suspension at 50° C. for 6 hours. The mixture was filtered and the lower organic phase collected, and the organic solvent therefrom was removed by vacuum distillation. The resulting product was washed twice with ether, whereby obtaining a high capacity high molecular polymer hydrogen storage material e.

The performance test of hydrogen release of the hydrogen storage material e was carried out. The result showed that, the peak temperature of hydrogen release of the material e is about 115° C., about 6.7 wt. % of pure hydrogen is released at 110° C., and no harmful impurity gas produced in the process.

Example 5

Figure 8:
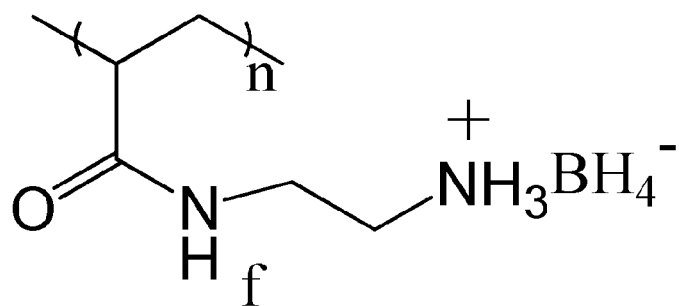
FIG. 8 shows a polymer hydrogen storage material f prepared in Example 5 of the invention.

Following the predation method in Example 1, the polymer a (polyacrylic acid, molecular weight of 20000) was used as material, the side chain of the polymer a was aminated by ethylene diamine, and then the aminated polymer reacted with sodium borohydride to prepare a high capacity high molecular polymer hydrogen storage material f, as shown in FIG. 8.

The performance test of hydrogen release of the hydrogen storage material f was carried out. The result showed that, the peak temperature of hydrogen release of the material f is about 109° C., about 4.6 wt. % of pure hydrogen is released at 115° C., and no harmful impurity gas produced in the process.

Example 6

Figure 9:
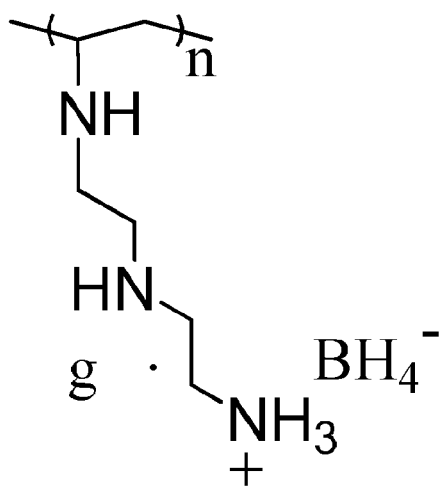
FIG. 9 shows a polymer hydrogen storage material g prepared in Example 6 of the invention.

Following the predation method in Example 2, polyvinyl chloride (molecular weight of 50000) was used as material, the side chain of the polymer was aminated by diethylenetriamine, and then the aminated polymer reacted with sodium borohydride to prepare a high capacity high molecular polymer hydrogen storage material g, as shown in FIG. 9.

The performance test of hydrogen release of the hydrogen storage material g was carried out. The result showed that, the peak temperature of hydrogen release of the material f is about 103° C., about 7.8 wt. % of pure hydrogen is released at 110° C., and no harmful impurity gas produced in the process.

Example 7

Poly styrene bromine-polybutyl acrylate copolymer (molecular weight of 30000, and the degree of polymerization of the bromostyrene monomer is 100) was dissolved in dioxane, and then ethylenediamine and potassium carbonate were added. The mixture was allowed to reflux reaction for 12 hours, and then was spin dried. The obtained product was washed thrice with deionized water and then dried to yield an aminated polymer.

Figure 10:
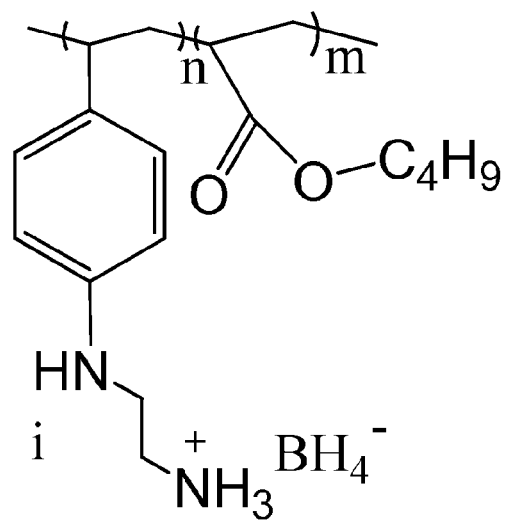
FIG. 10 shows a polymer hydrogen storage material i prepared in Example 7 of the invention.

The aminated polymer and sodium borohydride were mixed according to a stoichiometry ratio in an tetrahydrofuran suspension at room temperature for 8 hours. The mixture was filtered and the lower organic phase collected, and the organic solvent therefrom was removed by vacuum distillation. The resulting product was washed twice with ether, whereby obtaining a high capacity high molecular polymer hydrogen storage material i comprising 25 wt. % of ammonia borane derivative, as shown in FIG. 10.

The hydrogen storage material i can be coated on the surface of the tail piece of automobiles to form film.

The performance test of hydrogen release of the hydrogen storage material i was carried out. The result showed that, the peak temperature of hydrogen release of the material i is about 116° C., about 2.8 wt. % of pure hydrogen is released at 120° C., and no harmful impurity gas produced in the process.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A hydrogen storage material prepared by: (1) aminating a side chain or a terminal group of a linear polymer using a polyamine compound to yield an aminated polymer and (2) reacting the aminated polymer with borohydride to yield a polymer product comprising an ammonia borane derivative grafted to the side chain or the terminal group of the linear polymer.

2. The material of claim 1, wherein the linear polymer comprises polyvinyl chloride, polyvinyl chloride-polyethylene copolymer, polyethyleneimine, acrylate copolymer, polyacrylic acid, polystyrene, styrene-acrylate copolymer, polysiloxane; and the polyamine compound comprises 1-methyl-guanidine, guanidine, ethylenediamine, diethylenetriamine.

3. The material of claim 1, wherein the linear polymer comprises between 5000 and 50000 monomeric units, and the ammonia borane derivative grafted to the side chain or the terminal group of the linear polymer accounts for between 25 and 75 wt. % of a total weight of the polymer product.

4. The material of claim 1, being in the form of a film.

5. A method for preparing a hydrogen storage material, the method comprising:
   1) providing a linear polymer, aminating using a polyamine compound a side chain or a terminal group of the linear polymer to yield a polymer comprising a functionalized amine; and 2) mixing and stirring the polymer comprising functionalized amine and a borohydride according to a stoichiometry ratio in an organic suspension at a temperature of between 5 and 50° C. for between 1 and 12 hours, filtering and collecting a lower organic phase, removing an organic solvent therefrom by vacuum distillation, and washing a resulting polymer product comprising an ammonia borane derivative grafted to the side chain or the terminal group of the linear polymer.

6. The method of claim 5, wherein the linear polymer comprises polyvinyl chloride, polyvinyl chloride-polyethylene copolymer, polyethyleneimine, acrylate copolymer, polyacrylic acid, polystyrene, styrene-acrylate copolymer, polysiloxane; and the polyamine compound comprises 1-methyl-guanidine, guanidine, ethylenediamine, diethylenetriamine.

7. The method of claim 5, wherein the organic suspension comprises tetrahydrofuran, acetonitrile, dimethylsulfoxide, and the borohydride is selected from the group consisting of sodium borohydride, lithium borohydride, and potassium borohydride.

8. The method of claim 5, wherein prior to the amination, the side chain or the terminal group of the linear polymer is chemically modified.

9. The method of claim 5, further comprising post-processing the hydrogen storage material to form a film.

* * * * *